Dec. 15, 1964    J. W. DARLEY    3,160,953

FLOWER KNIFE

Filed Nov. 1, 1963

Malissie J. Darley
Administratrix of the Estate of
Jesse W. Darley, Deceased
INVENTOR.

BY *[signatures]*
Attorneys 3,160,953
FLOWER KNIFE
Jesse W. Darley, deceased, late of Fort Myers, Fla., by Malissie J. Darley, administratrix, 4430 Seminole Ave., Fort Myers, Fla.
Filed Nov. 1, 1963, Ser. No. 320,964
4 Claims. (Cl. 30—279)

The instant invention is generally concerned with a flower cutting knife, and is more particularly directed toward a novel shearing means for both stripping and cutting gladiolus stems.

It is a primary object of the instant invention to provide a device which can be utilized to quickly, easily and uniformly strip the foliage from a flower stem, in particular a gladiolus stem, and sever this stem at any point desired.

In conjunction with the above object, it is intended to provide a device wherein the foliage, while stripped from the flower stem, remains substantially intact relative to the remainder of the plant and bulb from which the plant has sprouted, this retention of the foliage resulting in the production of better bulbs.

Further, it is an object of the instant invention to provide a device which ensures a stripping of the foliage completely around the stem.

Likewise, it is an object of the instant invention to provide a tool which, while highly novel, is relatively simple in construction and capable of being easily held and manipulated, the stripping and cutting of the stem being effected by basically a single stroke.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
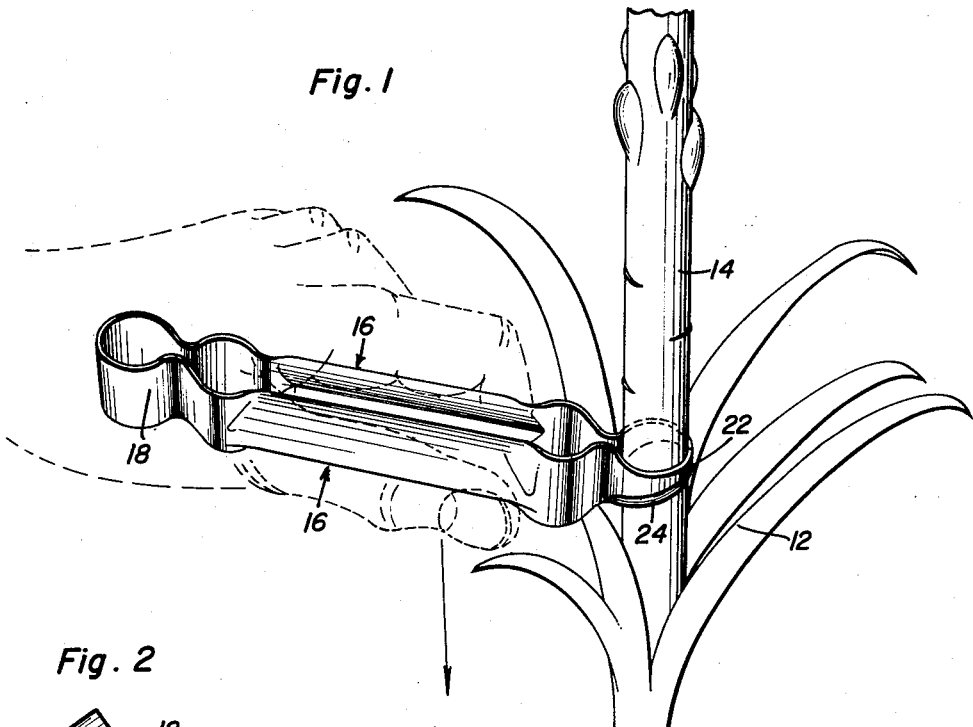
FIGURE 1 is a perspective view illustrating the manner in which the device of the instant invention is to be engaged about a flower stem.
Figure 2:
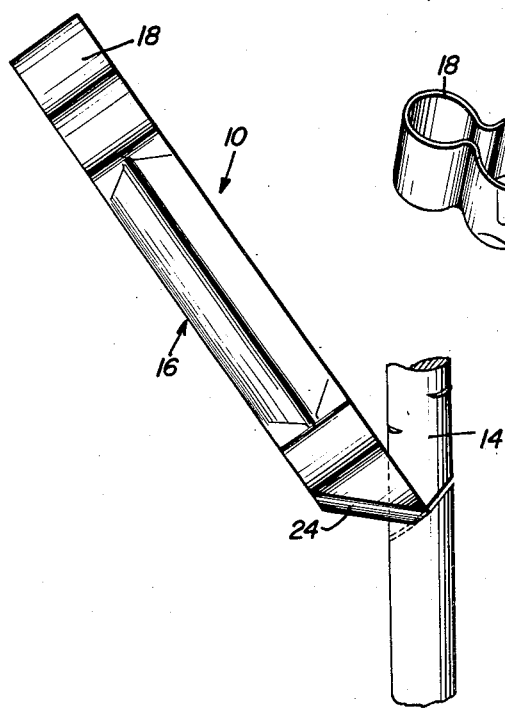
FIGURE 2 is a side elevational view illustrating the manner in which the device is to be moved so as to effect a severing of the stem.
Figure 3:
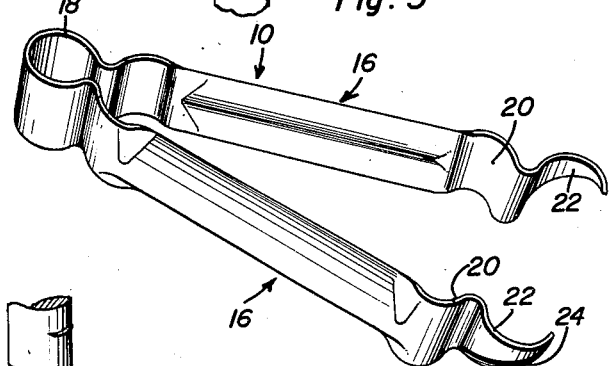
FIGURE 3 is a perspective view of the device in its open position.

Referring now more specifically to the drawings, reference numeral 10 is used to generally designate the flower knife comprising the instant invention, this knife 10 being used specifically for the purpose of stripping the foliage 12 away from a flower stem 14, particularly gladiolus, and subsequently severing the stem 14 at any desired point along the length thereof. FIGURE 1 illustrates the manner in which the device 10 is engaged about the stem 14 and positioned during the stripping of the foliage 12, and FIGURE 2 illustrates the manner in which the knife 10 is moved so as to effect a severing of the stem 14.

The knife 10 itself consists of an elongated strip of flat resilient metal bent in half so as to form two equal length diverging arms 16 interconnected by a resilient generally circular or cylindrical portion 18, this portion 18 possessing sufficient resiliency so as to, while allowing a compressing of the arms 16 together in the manner shown in FIGURE 1, allow an immediate outward springing of these arms 16 upon their release.

Each of the arms 16 is slightly bowed along a major portion of the longitudinal axis thereof both for rigidity and so as to conform the device to the hand of the user. Each arm 16, beyond the longitudinally bowed portion thereof, curves inwardly, as indicated by reference numeral 20 with this inwardly curved portion terminating in an inwardly opening semi-circular portion 22, the semi-circular portion 22 on the outer end portion of each of the arms 16 facing the other and, upon a bringing of the arms 16 together as illustrated in FIGURE 1, coming together so as to form a substantially circular portion, this also being clearly shown in FIGURE 1.

The actual stripping of the foliage 12 and cutting of the stem 14 is effected by the lower edge 24 of each of the portions 22, these lower edges 24 being sharpened so as to form knife or cutting edges capable of easily stripping the foliage 12 and severing the stem 14. It will be noted that each of these lower or cutting edges 24 is beveled or sloped upwardly and forwardly from the rear of each semi-circular portion 22 thereby achieving a smoother stripping of the foliage 12 as well as an easy severing of the stem 14 by merely a snap of the wrist. Incidentally, it will be noted that both extremities of the semi-circular portions 22 are located in planes slightly inwardly of the planes of the inner edges of the corresponding arms so as to enable a coming together of these semi-circular portions 22 without interference from the arms.

From the foregoing, it should be readily apparent that a novel flower knife has been defined which is capable of quickly stripping the foliage from a flower stem and subsequently severing the flower stem with basically a single stroke. In effecting this stripping and severing, the knife or implement is comfortably grasped in one hand and the arms compressed toward each other so as to engage the semi-circular cutting head about the flower stem, the shape of this cutting head enabling the accommodation of a variety of different size stems. After the cutting head is engaged about the stem, the upper portion of the stem is stabilized by the other hand and the tool is quickly moved downwardly along the stem so as to strip or sever the foliage therefrom, this being effected by the beveled cutting edges provided on the lower edges of the cutting head. After the desired length of stem is exposed, in substantially the same stroke, the wrist holding the implement is snapped or twisted moving the outer portion of the cutting head downwardly on an arc toward the user so as to cut directly through the stem as illustrated in FIGURE 2, thus producing a clean and desirable angled severing cut. After the stem has been severed, a release of the implement will enable the semi-circular portions of the cutting head to automatically spring apart ready for use on another flower stem.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A flower knife comprising a pair of elongated diverging equal length arms, means resiliently interconnecting said arms at the near end thereof for movement of the far ends of said arms toward and away from each other, the far end portion of each arm being generally semi-circular in shape with the axis of rotation of the semi-circular portion being perpendicular to the length of the arms, the semi-circular portions terminating in the far ends of the arms, these far ends being inwardly directed and laterally aligned, said semi-circular portions each including an upper edge and a lower edge, said semi-circular portions opening generally toward each other so as to form substantially a complete circle upon an approach of these end portions toward each other, the lower edge of each semi-circular portion being in the form of a cutting edge.

2. The structure of claim 1 wherein the cutting edge of each semi-circular portion slopes downwardly and rearwardly relative to the corresponding upper edge from the extreme far end of its arm to approximately the rear of the semi-circular portion thereby allowing a gradual engagement of the cutting edges upon movement of the knife longitudinally along a flower stalk.

3. The structure of claim 2 wherein the means interconnecting the arms is integral with the arms.

4. A flower stripping and cutting knife which in its stripping position is substantially horizontal, comprising a pair of elongated generally flat diverging arms, said arms in the stripping position being substantially horizontal and laterally aligned with each other, said arms each having the flat sides thereof vertically orientated so as to present upper and lower full length edges, means resiliently interconnecting the diverging arms at the near ends thereof for biasing the arms into the diverging position while allowing a movement of the far end portions toward each other, the far end portion of each arm, in the generally horizontal plane of the arm, being semi-circular in shape and opening inwardly toward the similarly shaped far end portion of the other arm so as to form substantially a complete circle upon a movement of these semi-circular far ends toward each other, said far end portions terminating in inwardly directed aligned ends which form the far ends of the arms, that portion of the lower edge of each arm defining the semi-circular far end portion being sharpened and upwardly inclined toward the free end so as to form a bevelled cutting edge which produces a slicing engagement with the foliage upon being moved vertically down a flower stem.

References Cited in the file of this patent
UNITED STATES PATENTS

| | | |
|---|---|---|
| 53,849 | McGill | Apr. 10, 1866 |
| 359,950 | Wilcox | Mar. 22, 1887 |
| 655,043 | Asbell | July 31, 1900 |
| 1,483,676 | Petersen | Feb. 12, 1924 |